May 14, 1968 W. R. BUTTS 3,383,207
METHOD FOR MAKING CELLULAR MATERIAL
Original Filed Jan. 3, 1967
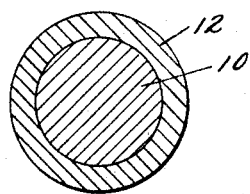
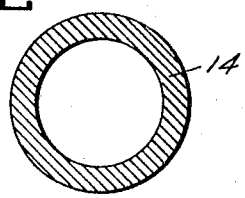
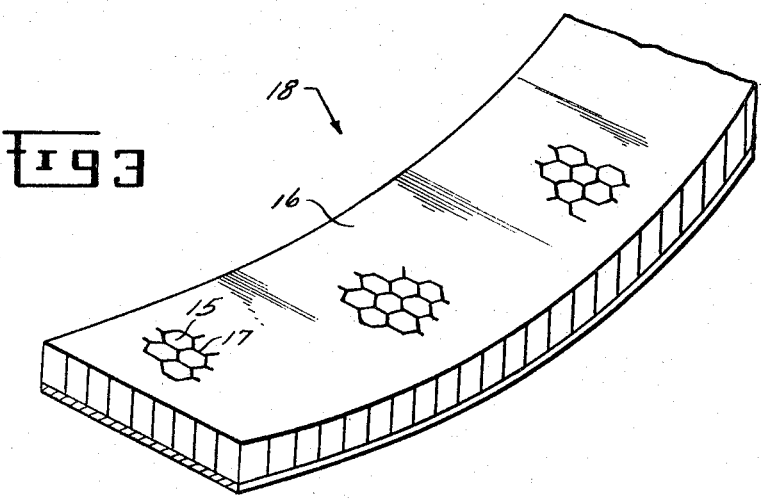
INVENTOR.
WILLIAM R. BUTTS
BY
ATTORNEY United States Patent Office 3,383,207
Patented May 14, 1968

3,383,207
METHOD FOR MAKING CELLULAR MATERIAL
William R. Butts, Milford, Ohio, assignor to General Electric Company, a corporation of New York
Original application Jan. 3, 1967, Ser. No. 606,656, now Patent No. 3,342,563, dated Sept. 19, 1967. Divided and this application May 2, 1967, Ser. No. 655,686
4 Claims. (Cl. 75—212)

ABSTRACT OF THE DISCLOSURE

A cellular material of hollow metallic aluminide particles bonded together is made from substantially spherical particles having an aluminum core enclosed by a shell of metal into which the aluminum preferentially will diffuse. A plurality of the aluminum cored particles are heated in a holder to diffuse the aluminum core into the shell while avoiding application to the particles of pressure sufficient to cause shell collapse.

---

This is a divisional application of application Serial No. 606,656, filed January 3, 1967, now Patent No. 3,342,563, and assigned to the assignee of the present invention.

This invention relates to a relatively low density material including cellular voids; and more particularly, to a relatively low density metallic material made predominantly of hollow powder-like particles bonded one to the other.

A variety of metallic materials which include cavities, voids, pores and the like have been used in such articles as oil retention bearings, filters, sound attenuation media, gas seals and others. Reported methods for making such materials have included the intermixing of metallic powders with materials which will vaporize or decompose under various conditions of temperature or vacuum to leave a void. One such method is described in U.S. Patent 2,917,384—Grandey issued Dec. 15, 1959. The inclusion of hollow metallic spheres in an otherwise bonded metallic structure is discussed in U.S. Patent 3,135,044—Mote et al. The method and article which resulted from the use of the intermixing of hollow organic particles with metallic powder and then heating to remove the organic material is discussed in U.S. Patent 3,052,967—Fischer.

One important application for lightweight cellular or porous metallic structures of this type are as seals co-operating with rotating blading members or wheels in axial flow compressors of gas turbine engines to prevent interstage leakage particularly at the tips of the blading members. Air leaking from higher pressure stages to lower pressure stages over the tips of the blades can result in significant losses in engine efficiency.

Whereas known foamed, cellular or porous materials have been used for such seals, one of the problems associated with this application has been difficulty in bonding of the porous material to a holding member. In order to provide additional structural strength and bonding surface, honeycomb structures have been used as back up members. In some cases, because of inadequate bonding characteristics of known porous or foamed materials, it has been necessary to use as a seal an open, unfilled, honeycomb structure. This arrangement is not as desirable as a filled honeycomb because solid shroud portions can correct efficiency-reducing air turbulence problems created by the use of open honeycomb.

A principal object of the present invention is to provide a relatively low density, cellular metallic material which has good abradability characteristics, is resistant to oxidation and erosion resulting from the flow of high velocity and high temperature air, will remain tightly bonded to a backing member such as honeycomb and will not shrink upon exposure to relatively high operating temperatures and conditions.

Another object is to provide a cellular metallic material which will expand during processing to improve contact and bonding within itself and to external members such as backing members.

These and other objects and advantages will be more fully understood from the following detailed description, examples and the drawing.

In the drawing:

FIG. 1 is an enlarged cross-sectional diagrammatic view of a nickel coated aluminum powder particle prior to processing;

FIG. 2 is an enlarged cross-sectional diagrammatic view of the powder particle of FIG. 1 after processing such as at 1950° F. for 2 hours in hydrogen; and FIG. 3 is an isometric partially sectional view of a gas turbine shroud segment including the material of the present invention.

The above objects can be achieved, according to a preferred form of the material of the present invention by providing a material comprising a plurality of hollow substantially spherical powder particles of a metal aluminide, preferably of at least one of the elements of the group iron, nickel, cobalt and their alloys, bonded together to form a cellular material. In one form, the hollow powder is bonded with a second powder such as a powdered material which will melt at a temperature lower than that of the hollow powdered aluminide particles. Typical examples of such a second powder are nickel, copper, silver and brazing alloys based on one or more of such elements. One application of the present invention is in the form of a composite article such as a gas turbine engine shroud or a member of a seal including a honeycomb support structure having open portions filled with the above described material of the present invention.

The method aspect of the present invention includes the steps of maintaining in intimate contact a plurality of substantially spherical powdered particles having a substantially spherical core of aluminum and a shell of a metal having a very slow rate of diffusion with respect to aluminum, preferably one selected from the group iron, nickel and cobalt, heating the powder to a temperature lower than the melting point of the shell material but sufficiently high enough to diffuse the aluminum core into the shell and to bond the powder together.

The preparation and application of coated powders, sometimes referred to as composite powders, is well known and widely reported in the literature. For example, patents and publications include U.S. Patents 2,853,398; 2,855,401 and particularly 2,853,403—Mackiw et al. all issued Sept. 23, 1958; "The Sintering and Alloying Behavior of Nickel Coated Metal Powders," by J. A. Lund, T. Krantz, and V. N. Mackiw in Progress in Powder Metallurgy, No. 16, Metal Powder Industries Federation, New York, N.Y., and "The Preparation of Nickel-Coated Powders," by B. Meddings, W. Kunda and V. N. Mackiw in Powder Metallurgy published by Interscience Publishers, New York, N.Y., in 1961. One form of nickel coated aluminium powders for flame spraying is available commercially from Sherritt Gordon Mines, Limited, Fort Saskatchewan, Alberta, Canada and from Metco Inc. of Westbury, New York, under the name of Metco 404 powder.

The substantially spherical nickel coated aluminum powder, such as shown diagrammatically in FIG. 1 and having a core 10 of aluminum and a shell 12 of nickel, when heated produces an alloy of nickel and aluminum. Ordinarily, these powders were developed, sold and are used for the production of alloys through flame spraying or powder metallurgy techniques. It was unexpectedly recognized, however, that when a plurality of such powders, while held in intimate contact, are heated to a temperature such as about 1600–2200° F. for a time sufficient to diffuse the aluminum core into the nickel shell, for example, one-half hour, a material is produced comprising a plurality of hollow expanded particles bonded together. This will occur when the particle walls are not forced into collapse such as would occur when subjected to the relatively high impact force which would result from flame spraying or the high compressive force in the usual powder metallurgical pressing and sintering operations. The intent of the present invention is to produce a porous or cellular structure whereas the intent of flame spraying and powder metallurgy compacting is to produce as dense a structure as possible.

In practicing the present invention, the hollow expanded particle of FIG. 2 is formed having a wall 14 of an alloy of nickel and aluminum. Thus the material made from the plurality of particles expands. When for some applications the powders were mixed with an additional lower melting bonding powder such as a brazing alloy, the expansion of the composite nickel coated aluminum during the reaction was sufficient to overcome the shrinkage which normally occurs during the bonding together of powders either by diffusion bonding or by brazing. Thus through the practice of the present invention, the problem of shrinkage which caused other types of abradable seal materials to become loosened and detached from open honeycomb was solved.

The nickel coated aluminum powder used predominantly in the evaluation of the present invention had an aluminum core 10 in FIG. 1 approximately 2–3 mils in diameter and a 0.3–0.5 mil thick nickel coating 12. However, in some instances, powders having aluminum cores of up to about 12 mils coated with up to about 1.2 mils of nickel coating were successfully used. As is described in co-pending application Ser. No. 606,963, filed Jan. 3, 1967, and assigned to the same assignee as this invention, spherical coated aluminum powders consisting essentially of 5–30 weight percent aluminum with the balance nickel can be used in the present invention without rupturing the outer shell upon processing. Amounts of aluminum greater than about 30 weight percent will cause collapse of the outer shell upon processing. Cores of aluminum of less than about 5 weight percent of the coated powder will be too small in volume to provide a significant hollow central portion for the material of the present invention.

As has been mentioned above, there have been many attempts in the past to develop a filler material for honeycomb. The key problem with known filler materials has been inadequate bonding of the filler to the honeycomb walls. This results from shrinkage due to sintering during processing or on subsequent exposure or both. To overcome this shrinkage tendency, a honeycomb filler material was needed which would expand during processing to grip or bear on the honeycomb cell walls. Other problems, in addition to the attachment problem, associated with the use of known filler materials were relatively low erosion resistance, high density and relatively poor oxidation resistance.

An important characteristic required in an abradable material when used to fill a honeycomb seal is that the material should be readily abradable in localized areas of contact in order to maintain minimum clearances such as between turbine blade tips and an abradable turbine shroud, such as that shown in FIG. 3. Known materials when applied to fill honeycomb cells, such as 15 in FIG. 3, have caused excessive turbine blade tip wear. This increases the clearances, reducing turbine efficiency. Frequently, under certain rub conditions, turbine blade material is deposited on the cooperating shroud surface such as 16 in FIG. 3, resulting in additional blade tip wear and further increases in clearances. The material of the present invention has the characteristic of good abradability early in the operating cycle. Thus it causes little wear on mating parts. After an initial wear-in period, the material develops superior resistance to oxidation in high velocity air and good resistance to erosion by hot gas streams while maintaining good bonding within the material and to the substrate material. In addition, it has low density and is resistant to gouging under severe rubs. Through proper selection of added bonding powder, the material's melting point can be adjusted, for example, to be above the normal operating temperature of the turbine.

Preliminary tests were conducted to develop a material for use as a filler for a honeycomb structure to be used as an abradable shroud. One of these tests included a honeycomb specimen shown generally at 18 in FIG. 3 having 0.156" cells 15 and a 0.015" thick wall 17 filled with the above described nickel coated aluminum powder having a composition, by weight, of 17–20 weight percent aluminum with the balance essentially nickel. After heat treatment in air at 1950° F. for 2 hours, this material was found to have expanded considerably, tightly filling the honeycomb cells. Additional specimens to further evaluate that phenomenon were prepared and treated in hydrogen at 1950° F. for 2 hours with the same result. During sintering while under substantially no external pressure, the aluminum comprising the core of the sphere was found to have diffused into the nickel shell, forming a nickel-aluminum alloy. The result was dimensional growth of the sphere without rupturing the sphere because the ratio of the aluminum to the nickel was sufficiently small. This expansion within the confining honeycomb structure caused the spheres to bond together at contact points as well as to the honeycomb walls thus forming a tightly bonded material of relatively low density. As has been described in the above identified co-pending application, this type of heat treatment for such composite powders results in a hollow structure if the ratio of the core to the shell is in the proper range.

During the evaluation of the present invention, a number of honeycomb structures of different sized cells were tested. The cell sizes included 0.156", 1/16" and 1/8" cells with 0.005 to a 0.015" thick wall and of a material consisting nominally of, by weight, 0.08% C, 22% Cr, 1.5% Co, 9% Mo, 0.6% W, 18.5% Fe with the balance Ni and incidental impurities, sometimes referred to as Hastelloy X alloy. The various cell sizes were used to study adherence of the material of the present invention to the honeycomb of both relatively large and small cell size.

The bonded spheres of the nickel-aluminum alloy provided an oxidation resistant alloy. For some applications as an abradable seal in gas turbine operation in which it was desired to increase the erosion resistance of the bonded hollow particles, the voids between the bonded hollow spherical powders were filled with additives. This was accomplished in various examples by mixing the nickel coated aluminum powder with substantially pure aluminum as well as with pure nickel and two nickel base brazing alloys the compositions of which are shown in the following Table I.

TABLE I.—ADDITIVE POWDERS (WT. PERCENT)

| Example | Ni | Al | C | Si | Fe | B | Mn | Cr |
|---------|-----|-----|-----|-----|-----|-----|-----|-----|
| 1 | Bal. | | | | | | | |
| 2 | Bal. | | .03 | 3.4 | 0.4 | 1.9 | | |
| 3 | Bal. | | .02 | 2.0 | 0.6 | | 0.7 | 18.6 |
| 4 | | Bal. | | | | | | |

The various powders were added to make a mixture of 5, 10, 15 and 25 weight percent additive powder with the balance nickel coated aluminum powder having a 3 mil diameter aluminum core with about a 0.5 mil nickel coating. After processing for about 2 hours in the range of 1900–2000° F., no improvement was recognized through use of the aluminum additive powder. However, additions of the nickel and nickel base brazing alloys showed significant improvement in all ranges tested and particularly at about the 25 weight percent addition.

During this evaluation, it was recognized that in certain instances, such as the application of the powders to curved shrouds, there was a problem of retaining all of the powder mixture in the cells during processing. In this regard, use was made of an aqueous binder solution of the type used in slip casting and comprising a 2.5% aqueous solution of ammonium alginate. The binder was used in a ratio of 11 parts of powder to 1 part of binder. It had been found that the use of greater amounts of liquid caused the resultant slurry to be too wet allowing air bubbles to rise to the surface. This formed surface voids during drying. In addition, a mixture of less than 11:1 powder-to-binder ratio resulted in too dry a slurry which was difficult to mix thoroughly and did not work easily into the honeycomb. Trowelling of the proper powder-binder mixture into the honeycomb cells resulted in no adverse effect on bonding. The mixture provided a material which would not shift in honeycomb cells even when inverted.

Although additions can be made of such materials as the brazing alloys of Examples 2 and 3 in Table I, because the maximum use temperature of such alloys are about 1400–1800° F., the operating temperature of the subsequently bonded material is limited to that range. Thus the material of the present invention contemplates the use of a bonding additive selected to be compatible with the nickel-coated aluminum powder and with the structural material in which it is to be placed as well as having an operating temperature sufficiently high for the intended use.

Because the operating temperature of the brazing alloy of Example 3 is up to about 1800° F., that alloy powder in mixtures of 5, 10, 15 and 25 weight percent with the balance nickel coated aluminum powder were processed for 1 hour at 2000° F. The commercially available nickel coated aluminum powder generally has a mesh size smaller than about 170 but greater than about +270. Therefore, it is preferred that the additive powders have a mesh size less than about 325 in order to promote adequate filling of the voids between the nickel coated aluminum powder during mixing of the unreacted powders. With regard to the use of the brazing alloy of Example 3 when mixed and processed with a compound powder as in Example 7 of Table II, the brazing alloy will coat the compound powder. Thus during processing, a hollow particle is produced having an outer coating of the alloy of Example 3. Higher material porosity, or conversely, low material density, along with improved bonding can be achieved in this way.

One procedure used to prepare open honeycomb shrouds of the type shown in the drawing for application of the material of the present invention was first to vapor or grit blast the honeycomb to remove any materials contaminating the surface. Then the honeycomb was vapor degreased such as with trichlorethylene. A filler material in the form of a slurry having the previously discussed powder-to-liquid binder ratio of 11:1 was trowelled into the honeycomb cells and compacted to fill completely each of the individual cells. Then the material was dried, such as in air for 12 hours or in an oven at 160° F. for 3 hours.

Plates can be placed over the open face of the shroud to assure that the expanding material will fill the honeycomb cells during processing and to promote the formation of an integrally bonded structure. The filled shrouds segments were then heated at 2000° F. in a hydrogen atmosphere furnace having about a −60° F. dew point. In order to prevent too rapid a reaction between the aluminum and the nickel of the nickel coated aluminum, the heating rate was controlled. For example, one heating cycle comprised 5 minutes to about 1400° F., 10 minutes to about 1700° F. and 20 minutes to about 2000° F. The shroud was held at 2000° F. for ¼–1½ hours depending upon the abradability desired in the product. Then the shroud was cooled and removed from the furnace.

After this processing, any cover plates were removed and the surface of the shroud segments was filed to smooth any raised or rough portions in preparation for evaluation procedures. The evaluation tests conducted on the various shroud segments thus prepared included static and dynamic oxidation, room temperature and 1800° F. erosion, abradability and density. Prior to testing, the accurate weight of each shroud segment was taken to the nearest 0.01 gram.

Preferred powder mixtures within the scope of this invention used as described above to fill shroud segments are shown in the following Table II.

TABLE II.—POWDER MIXTURES

| Example | Weight percent | |
|---|---|---|
| | Ni-coated Al* | Other |
| 5 | 75 | 25 Ni. |
| 6 | 75 | 25 (Example 2). |
| 7 | 75 | 25 (Example 3). |

*METCO 404.

Oxidation testing of the above identified sample segments were compared with various commercial materials which were candidates for turbine shroud materials. Static oxidation tests were conducted for 100 and 200 hours at 1800° F. on nickel filled and copper filled wire mesh and sintered nickel. Some results of this oxidation comparison testing is shown in the following Table III.

TABLE III.—1800° F. STATIC OXIDATION TEST DATA ABRADABLE MATERIALS AFTER 100 HRS. IN AIR

| Shroud filler material: | Avg. net wt. gain (percent) [a] |
|---|---|
| Ni filled wire mesh | 6.4 |
| Cu filled wire mesh | [b] 27.8 |
| Sintered Ni | 15.9 |
| Example 5 | 2.7 |
| Example 6 | 3.5 |
| Example 7 | 3.9 |

[a] Total gain of shroud including filler less gain in shroud alone.
[b] Spalled and badly warped.

Of the commercially available abradable materials, the sintered nickel powder appeared to have the greatest integrity because the NiO formed was adherent and very hard. However, the increase in hardness makes this material relatively unsuitable as an abradable material. It is easily seen that the material of the present invention as represented by Examples 5, 6 and 7 are significantly more oxidation resistant than the other materials tested.

Shroud segments prepared as described above and including the material of Examples 5, 6 and 7 also were evaluted in two dynamic oxidation tests here designated as Test A and Test B. In Test A, the specimens were heated in a dynamic oxidation flame tunnel for 4 hours at 1800° F. with intermittent cooling every 30 minutes to 950° F. This was followed by 38 hours at 2000° F. In Test B, another set of specimens were heated for 50 hours at 1800° F. with a cooling cycle every 30 minutes to 950° F. Weight gain data of these tests are shown in the following Table IV.

TABLE IV.—DYNAMIC OXIDATION TEST DATA

| | Wt. Gain percent | |
|---|---|---|
| | Test A | Test B |
| Shroud Filler Material: | | |
| Example 5 | 4.8 | 2.9 |
| Example 6 | 5.0 | 3.1 |
| Example 7 | 4.7 | 3.5 |

It is quite clear from these tests that the honeycomb filled with the material of the present invention, particularly when including added fillers, is significantly more oxidation resistant than the other commercially available materials tested.

One of the primary concerns in the application of an abradable material to a turbine shroud is the material's ability to resist the erosive flow of hot gases and gas borne particles contacting the abradable material. In an effort to evaluate erosion of the material of the present invention compared with other commercially available materials, erosion tests were conducted from room temperature to 1800° F. The specimens were mounted on a disc which rotated at speeds between 200 and 450 r.p.m. inside a flame tunnel. Abrasive particles are introduced into the flame tunnel from a nozzle located about 2 inches from the test specimen. The abrasive used was 50 micron aluminum oxide particles introduced at a rate of 8 grams per minute under a pressure of 80 p.s.i.g.

The results of such high temperature erosion tests can be judged only on the basis of visual examination of the extent and depth of erosion. Weight change determinations are meaningless because specimens oxidize at different rates. However, in the evaluation of the material of the present invention compared with the other above identified commercially available materials, the mixture of Example 7 in Table II was the best, the mixture of Example 5 was second best and the mixture of Example 6 was third best. However, all of those mixtures were better than the commercially available materials tested.

With regard to abradability characteristics, samples of open face honeycomb of the Hastelloy X alloy previously described unfilled and also filled with the materials of the present invention were rubbed against two designs of rotating discs. The first type of test involved rubbing a 410 stainless steel alloy labyrinth seal configuration into the cellular material of the present invention. Also plunging the seal into the material, the seal was moved sideways to determine abradability and extent of wear or material pickup on the wheel. The second type of test was conducted using 410 stainless steel alloy wheel having simulated compressor blades. The material of the present invention was seen to have excellent abradability with virtually no pickup of material by the parts rubbed into the abradable material of the present invention.

Between about 5–35 weight percent additive powder has been mixed with nickel coated aluminum to provide a bonded material according to the present invention. However, it is preferred that such additives be maintained at about 25 weight percent because of the unusual balance between initial abradability, oxidation resistance and erosion resistance afforded by such a mixture after processing.

Although the present invention has been described in connection with specific examples, it will be recognized by those skilled in the art, the modifications and variations of which the invention is capable, particularly in view of what has been reported in connection with composite powders and the various coating processes available. It is intended in the appended claims to cover all such variations and modifications.

What is claimed is:
1. A method for making an improved cellular material comprising a plurality of hollow, substantially spherical particles of a metallic aluminide bonded together to form a cellular material comprising:
   placing in a holder a powder of a plurality of substantially spherical particles consisting essentially of a core of aluminum enclosed by a shell of a metal into which the core of aluminum preferentially will diffuse upon heating, the shell consisting of about 5–30 weight percent of each particle;
   and then heating the powder to 1600–2200° F. for a time sufficient to allow diffusion of the aluminum core into the shell material, while at the same time,
   avoiding the application to the particles of pressure in an amount which would bring about collapse of the shell during processing.
2. The method as described in claim 1 comprising the steps of:
   blending together to form a powder mixture,
      (a) a first powder of a plurality of substantially spherical particles consisting of a core of aluminum enclosed by a shell of a metal selected from the group consisting of Fe, Ni, Co and their alloys, the shell consisting of about 5–30 weight percent of each particle, with
      (b) a second powder of a material selected from the group consisting of Ni, Cu, Ag and brazing alloys based on at least one of such elements and having a melting point lower than the melting point of the reaction product of the first powder when heated at 1600–2200° F.,
      (c) the powder mixture consisting essentially of 5–35 weight percent of the second powder with the balance the first powder;
   placing the powder mixture in a holder; and then
   heating the mixture to 1600–2200° F. in a non-oxidizing atmosphere for a time sufficient to allow diffusion in the first powder of the aluminum core into the shell and to allow the second powder to braze together the shells of the first powder to produce an integral composite cellular material.
3. The method of claim 2 in which
   the first powder has a core of aluminum and a shell of nickel,
   the second powder is a nickel base brazing alloy, and
   the mixture is heated in the range of 1900–2100° F.
4. The method of claim 3 in which the powder mixture consists essentially of about 25 weight percent nickel base brazing alloy with the balance the first powder of nickel coated aluminum.

References Cited
UNITED STATES PATENTS

| | | | |
|---|---|---|---|
| 3,004,332 | 10/1961 | Werner | 75—212 X |
| 3,264,073 | 8/1966 | Schmitt | 29—182 |
| 3,312,632 | 4/1967 | Smith | 264—15 X |

BENJAMIN R. PADGETT, *Primary Examiner.*

A. J. STEINER, *Assistant Examiner.*

UNITED STATES PATENT AND TRADEMARK OFFICE
CERTIFICATE OF CORRECTION

PATENT NO. : 3,383,207
DATED : May 14, 1968
INVENTOR(S) : W. R. Butts

It is certified that error appears in the above-identified patent and that said Letters Patent are hereby corrected as shown below:

Column 8, line 7, change "shell" to --core--.

Column 8, line 22, change "shell" to --core--.

Signed and Sealed this

Twenty-fourth Day of November 1981

[SEAL]

Attest:

GERALD J. MOSSINGHOFF

Attesting Officer    Commissioner of Patents and Trademarks